(12) United States Patent
Sommerhoff et al.

(10) Patent No.: US 10,260,406 B2
(45) Date of Patent: Apr. 16, 2019

(54) SUPERCHARGED INTERNAL COMBUSTION ENGINE WITH MIXED-FLOW TURBINE

(71) Applicant: Ford Global Technologies, LLC, Dearborn, MI (US)

(72) Inventors: Franz Arnd Sommerhoff, Aachen (DE); Andreas Kuske, Geulle (NL); Vanco Smiljanovski, Bedburg (DE); Helmut Matthias Kindl, Aachen (DE); Joerg Kemmerling, Monschau (DE)

(73) Assignee: Ford Global Technologies, LLC, Dearborn, MI (US)

( * ) Notice: Subject to any disclaimer, the term of this patent is extended or adjusted under 35 U.S.C. 154(b) by 456 days.

(21) Appl. No.: 14/810,211

(22) Filed: Jul. 27, 2015

(65) Prior Publication Data
US 2016/0040590 A1 Feb. 11, 2016

(30) Foreign Application Priority Data

Aug. 11, 2014 (DE) ........................ 10 2014 215 885

(51) Int. Cl.
*F01D 17/16* (2006.01)
*F01D 17/20* (2006.01)
(Continued)

(52) U.S. Cl.
CPC .............. *F02B 37/24* (2013.01); *F01D 17/16* (2013.01); *F01D 17/165* (2013.01); *F01D 17/20* (2013.01);
(Continued)

(58) Field of Classification Search
CPC ........ F02B 37/013; F02B 37/00–37/24; Y02T 10/144; F04D 29/56–29/566; F01D 17/00–17/26
See application file for complete search history.

(56) References Cited

U.S. PATENT DOCUMENTS 2,460,778 A * 2/1949 Willgoos ................ F02B 33/00
415/147
3,243,159 A * 3/1966 Hefler .................... F01D 17/165
415/148

(Continued)

FOREIGN PATENT DOCUMENTS

CN 102182546 A 9/2011
CN 103388495 A 11/2013
(Continued)

OTHER PUBLICATIONS

State Intellectual Property Office of the People's Republic of China, Office Action and Search Report Issued in Application No. 201510490232.4, dated Sep. 3, 2018, 16 pages. (Submitted with Partial Translation).

*Primary Examiner* — Laert Dounis
(74) *Attorney, Agent, or Firm* — Julia Voutyras; McCoy Russell LLP

(57) ABSTRACT

The disclosure relates to a supercharged internal combustion with a mixed flow turbine. In one example, a system comprises a mixed-flow turbine having a turbine shaft coupled to a compressor, a plurality of guide vanes arranged in an inlet of the mixed-flow turbine, a plurality of bevel wheels each coupled to a respective guide vane via a respective guide vane shaft, a pinion wheel with a plurality of teeth to mesh with the plurality of bevel wheels, and a pinion drive coupled to one of the bevel wheels.

20 Claims, 3 Drawing Sheets

(51) Int. Cl.
*F02B 37/24* (2006.01)
*F02B 37/00* (2006.01)
*F02B 37/013* (2006.01)
*F02C 6/12* (2006.01)

(52) U.S. Cl.
CPC .......... *F02B 37/004* (2013.01); *F02B 37/013* (2013.01); *F02C 6/12* (2013.01); F05D 2220/40 (2013.01); F05D 2260/4031 (2013.01); *Y02T 10/144* (2013.01)

(56) References Cited

U.S. PATENT DOCUMENTS

| | | | | |
|---|---|---|---|---|
| 6,039,534 | A | * | 3/2000 | Stoner ................... F01D 17/162 415/150 |
| 7,632,064 | B2 | | 12/2009 | Somanath et al. |
| 2004/0134193 | A1 | * | 7/2004 | Klingel ................... F02B 37/18 60/612 |
| 2007/0204615 | A1 | * | 9/2007 | Vrbas ................... F01D 17/162 60/602 |
| 2015/0016968 | A1 | * | 1/2015 | Grabowska ............. F02B 37/24 415/148 |

FOREIGN PATENT DOCUMENTS

| | | | | |
|---|---|---|---|---|
| DE | 10311227 | A1 | | 9/2004 |
| EP | 1710415 | A1 | | 10/2006 |
| JP | 58167824 | A | * | 10/1983 ............... F02B 37/24 |
| JP | 58167825 | A | * | 10/1983 ............... F02B 37/24 |
| JP | 60125727 | A | * | 7/1985 ........... F01D 17/165 |
| JP | 61205330 | A | * | 9/1986 ........... F01D 17/165 |
| JP | 10274048 | A | * | 10/1998 |
| JP | 2000120442 | A | | 4/2000 |
| WO | 2008055930 | A1 | | 5/2008 |
| WO | 2013116136 | A1 | | 8/2013 |

* cited by examiner

SUPERCHARGED INTERNAL COMBUSTION ENGINE WITH MIXED-FLOW TURBINE

CROSS REFERENCE TO RELATED APPLICATIONS

The present application claims priority to German Patent Application No. 102014215885.0, filed Aug. 11, 2014, the entire contents of which are hereby incorporated by reference for all purposes.

FIELD

The invention relates to a supercharged internal combustion engine.

BACKGROUND/SUMMARY

In recent years, there has been a trend in development toward small, highly supercharged engines, wherein supercharging is primarily a method of increasing power, in which the air required for the combustion process in the engine is compressed. The economic significance of said engines for the automotive engineering industry is ever increasing.

For supercharging, use is often made of an exhaust-gas turbocharger, in which a compressor and a turbine are arranged on the same shaft. The hot exhaust-gas flow is supplied to the turbine and expands in the turbine with a release of energy, as a result of which the shaft is set in rotation. The energy supplied by the exhaust-gas flow to the turbine and ultimately to the shaft is used for driving the compressor which is likewise arranged on the shaft. The compressor delivers and compresses the charge air supplied to it, as a result of which supercharging of the cylinders is obtained. A charge-air cooler is advantageously provided in the intake system downstream of the compressor, by means of which charge-air cooler the compressed charge air is cooled before it enters the at least one cylinder. The cooler lowers the temperature and thereby increases the density of the charge air, such that the cooler also contributes to improved charging of the cylinders, that is to say to a greater air mass. Compression by cooling takes place.

The advantage of an exhaust-gas turbocharger in relation to a mechanical charger is that no mechanical connection for transmitting power exists or is required between charger and internal combustion engine. While a mechanical charger extracts the energy required for driving it entirely from the internal combustion engine, and thereby reduces the output power and consequently adversely affects the efficiency, the exhaust-gas turbocharger utilizes the exhaust-gas energy of the hot exhaust gases.

As already mentioned, supercharging serves for increasing power. The air required for the combustion process is compressed, as a result of which a greater air mass can be supplied to each cylinder per working cycle. In this way, the fuel mass and therefore the mean pressure can be increased.

Supercharging is a suitable means for increasing the power of an internal combustion engine while maintaining an unchanged swept volume, or for reducing the swept volume while maintaining the same power. In any case, supercharging leads to an increase in volumetric power output and an improved power-to-weight ratio. If the swept volume is reduced, it is thus possible to shift the load collective toward higher loads, at which the specific fuel consumption is lower. By means of supercharging in combination with suitable transmission configurations, it is also possible to realize so-called downspeeding, with which it is likewise possible to achieve a lower specific fuel consumption.

Supercharging consequently assists in the constant efforts in the development of internal combustion engines to minimize fuel consumption, that is to say to improve the efficiency of the internal combustion engine.

It is a further basic aim to reduce pollutant emissions. Supercharging can likewise be expedient in solving this problem. With targeted configuration of the supercharging, it is possible specifically to obtain advantages with regard to efficiency and with regard to exhaust-gas emissions.

The torque characteristic of a supercharged internal combustion engine can be improved through the use of multiple turbochargers, for example by means of multiple turbines of relatively small turbine cross section arranged in parallel, wherein turbines are activated in succession with increasing exhaust-gas flow rate, or by means of multiple exhaust-gas turbochargers connected in series, of which one exhaust-gas turbocharger serves as a high-pressure stage and one exhaust-gas turbocharger serves as a low-pressure stage.

With regard to the configuration of the exhaust-gas turbocharging, it is basically sought to arrange the turbine or turbines as close as possible to the outlet of the internal combustion engine, that is to say to the outlet openings of the cylinders, in order thereby to be able to make optimum use of the exhaust-gas enthalpy of the hot exhaust gases, which is determined significantly by the exhaust-gas pressure and the exhaust-gas temperature, and to ensure a fast response behavior of the turbocharger. A close-coupled arrangement not only shortens the path of the hot exhaust gases to the turbine but also reduces the volume of the exhaust-gas discharge system upstream of the turbine. The thermal inertia of the exhaust-gas discharge system likewise decreases, specifically owing to a reduction in the mass and length of the part of the exhaust-gas discharge system leading to the turbine.

For the reasons stated above, it is also the case according to the prior art that the exhaust manifold is commonly integrated in the cylinder head. The integration of the exhaust manifold additionally permits dense packaging of the drive unit. Furthermore, the exhaust manifold can benefit from a liquid-type cooling arrangement that may be provided in the cylinder head, such that the manifold does not need to be manufactured from materials that can be subject to high thermal load, which are expensive.

According to the prior art, the turbine that is arranged in the exhaust-gas discharge system may be of different types of construction. The turbine of an exhaust-gas turbocharger is commonly of radial type of construction, that is to say the flow approaching the rotor blades of the impeller runs substantially radially. "Substantially radially" means that the speed component in the radial direction is greater than the axial speed component. The speed vector of the flow intersects the shaft of the exhaust-gas turbocharger at right angles if the approaching flow runs exactly radially. A radial turbine is described for example in EP 1 710 415 A1.

To make it possible for the rotor blades to be approached by flow radially, the inlet region for the supply of the exhaust gas is, according to the prior art, in the form of a spiral or worm housing running in encircling fashion, such that the flow of exhaust gas approaching the turbine impeller runs substantially radially.

For this purpose, it is occasionally necessary for the exhaust gas to be redirected or diverted in order that it can be supplied to the radial turbine. To be able to utilize the exhaust-gas energy in as efficient a manner as possible, however, the exhaust gas should be diverted to the least possible extent. Any change in direction of the exhaust-gas flow, for example owing to a curvature of the exhaust-gas discharge system, results in a pressure loss in the exhaust-gas flow and thus in an enthalpy loss. It is however often also possible for a radial turbine to advantageously be part of the exhaust-gas discharge system, for example as a high-pressure turbine of a multi-stage supercharging arrangement, and the change in direction in the turbine can be utilized to realize a compact design of the supercharging arrangement and of the internal combustion engine.

The turbine of an exhaust-gas turbocharger is occasionally also designed as an axial turbine, that is to say the flow approaching the impeller blades runs substantially axially. "Substantially axially" means that the speed component in the axial direction is greater than the radial speed component. The speed vector in the approaching flow in the region of the impeller runs parallel to the shaft of the exhaust-gas turbocharger if the approaching flow runs exactly axially.

According to the prior art, it is often the case even in axial turbines that the inlet region for the supply of the exhaust gas is in the form of a spiral or worm housing running in encircling fashion, such that, at least in the inlet region, the flow of the exhaust gas runs or is guided obliquely or radially with respect to the shaft. In the case of axial turbines, a diversion of the exhaust gas leads to losses with regard to the available exhaust-gas enthalpy. EP 1 710 415 A1 describes an axial turbine of said type.

In general, turbines are designed to be of so-called mixed-flow type of construction, in which the speed vector of the approaching flow has both a radial speed component and an axial speed component, where a mixed-flow turbine comprises at least one impeller arranged in a turbine housing and mounted on a rotatable turbine shaft. In relation to a purely radial turbine, the mixed-flow turbine is characterized by a lower inertia, which results from the smaller diameter of the impeller.

The mixed-flow turbine may be equipped with a variable turbine geometry, which permits a more precise adaptation to the respective operating point of the internal combustion engine by means of an adjustment of the turbine geometry or of the effective turbine cross section. Here, guide vanes for influencing the flow direction are arranged in the inlet region of the turbine. In contrast to the rotor blades of the rotating impeller, the guide vanes do not rotate with the shaft of the turbine.

If the turbine has a fixed, invariable geometry, the guide vanes are arranged in the inlet region so as to be not only stationary but rather also completely immovable, that is to say rigidly fixed. In contrast, if use is made of a turbine with variable geometry, the guide vanes are arranged so as to be stationary but not so as to be completely immovable, rather so as to be rotatable about their axes, such that the flow approaching the rotor blades can be influenced.

In some examples of a mixed-flow turbine of an internal combustion engine, there may be arranged upstream of the at least one impeller an adjustable guide device which comprises guide vanes that can be rotated by means of an adjustment device. The adjustment device may be a rotatable adjustment ring which is mounted coaxially with respect to the turbine shaft of the mixed-flow turbine, wherein each guide vane is arranged on a guide vane-specific shaft. The guide vanes are kinematically coupled to the adjustment ring via intermediate elements, such that rotation of the ring causes the guide vanes to be adjusted.

WO 2013/116136 A1 describes a guide device and adjustment device of said type in which pivotable levers are used as intermediate elements, each of which is, at one end thereof, connected rotationally conjointly by way of a bore to a guide vane-specific shaft, and at the other, spherical end thereof, mounted movably in a recess of the adjustment ring.

A disadvantage of the described adjustment device is that the levers are directed inward from the adjustment ring, that is to say the adjustment ring is an adjustment ring situated to the outside of the levers. This leads to large diameters of the adjustment ring, which cannot be integrated into the turbine housing but must be arranged adjacent to the housing. The turbine is thus made altogether larger, that is to say less compact; in particular, its length in the direction of the turbine shaft increases considerably.

Furthermore, in WO 2013/116136 A1, the guide vane-specific shafts on which the guide vanes are arranged are of offset design. This leads to a tumbling motion of the guide vanes during the rotation of the guide vane-specific shafts by means of the adjustment ring, that is to say to complex kinematics, which makes it difficult to realize a gapless arrangement of the rotatable guide vanes in the inlet region and makes it impossible to realize the gapless arrangement of the guide vanes in multiple rotational positions.

The inventors have recognized the above issues and provide a supercharged internal combustion engine to at least partly address the issues. In one example, the engine includes an intake system for the supply of charge air; an exhaust-gas discharge system for the discharge of the exhaust gas; and at least one mixed-flow turbine which is arranged in the exhaust-gas discharge system. The mixed-flow turbine includes a turbine housing having an inlet region; at least one impeller arranged in the turbine housing and mounted on a rotatable turbine shaft; an adjustable guide device arranged in the inlet region upstream of the at least one impeller, the adjustable guide device comprising one or more guide vanes, each guide vane arranged on a guide vane-specific shaft; an adjustment device configured to rotate the one or more guide vanes, the adjustment device having a rotatable adjustment ring which is mounted coaxially with respect to the turbine shaft of the mixed-flow turbine, the rotatable adjustment ring having an external toothing; and one or more gearwheels each arranged on a respective guide vane-specific shaft, each gearwheel configured to mesh with the external toothing of the adjustment ring, such that the one or more guide vanes are adjusted by rotation of the adjustment ring.

The rotatable adjustment ring of the internal combustion engine according to the disclosure has an external toothing. As intermediate elements, use is made of gearwheels which are arranged on the guide vane-specific shafts and which mesh with the external toothing of the adjustment ring. In this way, the guide vanes are kinematically coupled to the adjustment ring. A rotation of the ring causes the guide vanes to be adjusted, wherein the toothing ensures a unique kinematic assignment between the rotational position of the adjustment ring and the position of the guide vanes.

The guide vane-specific gearwheels are arranged around the outside of the adjustment ring, that is to say the adjustment ring forms an adjustment ring situated to the inside of the gearwheels. Consequently, the adjustment ring according to the disclosure can be formed with a relatively small diameter. In relation to the adjustment rings known from the prior art, the adjustment ring of relatively small diameter according to the invention can be integrated into the turbine housing, that is to say, in the case of a spiral or worm housing, indented in the direction of the exhaust gas-conducting lines, that is to say arranged adjacent to said lines. The turbine is thus made more compact, less voluminous and shorter in the direction of the turbine shaft. The adjustment ring itself has a lower weight and, owing to its smaller diameter, also a reduced moment of inertia with regard to its rotational movement.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
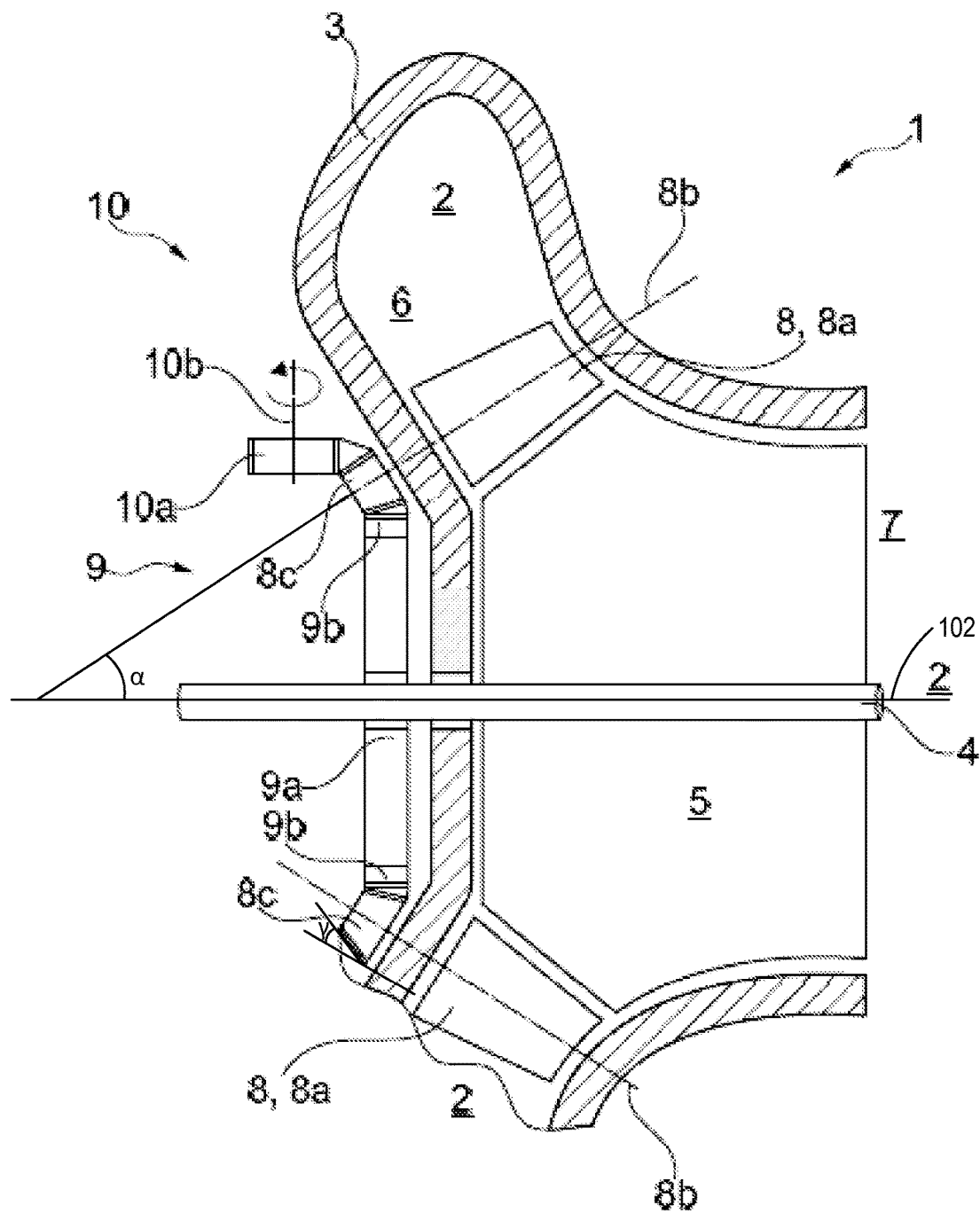
FIG. 1 schematically shows an example mixed-flow turbine of a supercharged internal combustion engine, partially in section.

A mixed flow turbine that receives exhaust gas from an internal combustion engine, for example, in both the radial and axial direction may offer smaller rotational inertia (smaller outer diameter) compared to radial type turbine wheels. The application of variable guiding vanes (upstream of the turbine wheel entry) may be used to enhance the operating range of a radial turbine. Variable guiding vanes may therefore also be applied to mixed flow turbines to enhance their operating range. However, the rotating axis of variable guiding vanes on a mixed flow turbine wheel have to be inclined compared to a horizontal axis on a radial turbine. This inclination may make actuation of the vanes difficult. Thus, according to embodiments disclosed herein, the guide vanes of a variable geometry turbine configured to be receive mixed flow exhaust gas may be actuated by a bevel gear mechanism including a plurality of bevel wheels rotatable by a pinion wheel. Each bevel wheel may be coupled to a guide vane shaft such that rotation of a given bevel wheel causes rotation of a respective guide vane shaft and hence adjustment of a position of a respective guide vane. The pinion wheel may be rotated by one of the plurality of bevel wheels that is coupled to a pinion drive or other suitable gear drive mechanism. In this way, rotation of the inclined guide vane shafts may be carried out without placing undue stress on any gears or other actuation mechanisms.

Within the context of the present invention, the expression "internal combustion engine" encompasses diesel engines and Otto-cycle engines and also hybrid internal combustion engines, which utilize a hybrid combustion process, and hybrid drives which comprise not only the internal combustion engine but also an electric machine which can be connected in terms of drive to the internal combustion engine and which receives power from the internal combustion engine or which, as a switchable auxiliary drive, additionally outputs power.

According to the disclosure, the guide device has multiple rotatable guide vanes, wherein, in the context of the present invention, this means that the guide device comprises at least two guide vanes, that is to say two guide vanes, three guide vanes, four guide vanes, five guide vanes, six guide vanes, or more guide vanes.

Examples of the supercharged internal combustion engine are provided in which the guide vane-specific gearwheels are arranged on the outer circumference of the adjustment ring.

Examples of the supercharged internal combustion engine are provided in which the at least one mixed-flow turbine arranged in the exhaust-gas discharge system is the turbine of an exhaust-gas turbocharger which comprises a turbine arranged in the exhaust-gas discharge system and a compressor arranged in the intake system. Reference is made to the statements made at the outset with regard to the exhaust-gas turbocharging arrangement.

In this case, examples are provided in which the associated compressor of the exhaust-gas turbocharger likewise has a variable compressor geometry. The variable geometry of the compressor offers advantages in particular in operating states in which virtually no exhaust gas flows through the mixed-flow turbine and thus virtually no power is provided by the mixed-flow turbine for compressing the charge air. In these situations, the associated compressor merely constitutes a flow resistance for the charge air. A variable compressor geometry then permits dethrottling of the intake system by an increase of the flow cross section of the compressor.

Examples of the supercharged internal combustion engine are provided in which at least two exhaust-gas turbochargers are provided which each comprise a turbine arranged in the exhaust-gas discharge system and a compressor arranged in the intake system.

In the prior art, if a single exhaust-gas turbocharger is used, a considerable torque drop is observed if a certain engine speed is undershot. Said torque drop is understandable if one takes into consideration that the charge pressure ratio is dependent on the turbine pressure ratio. If the engine speed is reduced, this leads to a smaller exhaust-gas mass flow and therefore to a lower turbine pressure ratio. Consequently, toward lower engine speeds, the charge pressure ratio likewise decreases. This equates to a torque drop.

The torque characteristic of the supercharged internal combustion engine may be improved through the use of multiple turbochargers arranged in parallel, that is to say by multiple turbines of small turbine cross section arranged in parallel, wherein turbines are activated successively with increasing exhaust-gas flow rate.

The torque characteristic may also be advantageously influenced by means of multiple exhaust-gas turbochargers connected in series. By connecting two exhaust-gas turbochargers in series, of which one exhaust-gas turbocharger serves as a high-pressure stage and one exhaust-gas turbocharger serves as a low-pressure stage, the engine characteristic map can advantageously be expanded, specifically both in the direction of smaller compressor flows and also in the direction of larger compressor flows.

In particular, with the exhaust-gas turbocharger which serves as a high-pressure stage, it is possible for the surge limit to be shifted in the direction of smaller compressor flows, as a result of which high charge pressure ratios can be obtained even with small compressor flows, which considerably improves the torque characteristic in the lower engine speed range. This is achieved by designing the high-pressure turbine for small exhaust-gas mass flows and by providing a bypass line by which, with increasing exhaust-gas mass flow, an increasing amount of exhaust gas is conducted past the high-pressure turbine. For this purpose, the bypass line branches off from the exhaust-gas discharge system upstream of the high-pressure turbine and opens into the exhaust-gas discharge system again upstream of the low-pressure turbine. In the bypass line there is arranged a shut-off element for controlling the exhaust-gas flow conducted past the high-pressure turbine.

The downsizing effect is further enhanced by way of multi-stage supercharging by exhaust-gas turbochargers. Furthermore, the response behavior of an internal combustion engine supercharged in this way is considerably improved in relation to a similar internal combustion engine with single-stage supercharging. The relatively small high-pressure stage is less inert because the rotor of a smaller-dimensioned exhaust-gas turbocharger can be accelerated more quickly.

For the reasons stated above, examples of the supercharged internal combustion engine are therefore provided in which a first exhaust-gas turbocharger serves as a low-pressure stage and a second exhaust-gas turbocharger serves as a high-pressure stage, wherein the second turbine of the second exhaust-gas turbocharger is arranged upstream of the first turbine of the first exhaust-gas turbocharger, and the second compressor of the second exhaust-gas turbocharger is arranged downstream of the first compressor of the first exhaust-gas turbocharger.

Examples of the supercharged internal combustion engine are provided in which the external toothing of the rotatable adjustment ring is a straight toothing. The outer sides of the gearwheel teeth preferably run parallel to the turbine shaft. A straight toothing has advantages for the compensation of changes in length of the guide vane-specific shafts resulting from the thermal loading imparted by the hot exhaust gas.

Examples of the supercharged internal combustion engine are provided in which each gearwheel arranged on a guide vane-specific shaft is an externally toothed bevel gear. A bevel gear as intermediate element is particularly suitable for kinematically coupling the adjustment ring, which is mounted coaxially with respect to the turbine shaft, to the guide vanes which are each arranged on a shaft that is inclined in relation to the turbine shaft.

In this connection, examples of the supercharged internal combustion engine are provided in which each guide vane-specific shaft forms an acute angle $\alpha$ with the turbine shaft, wherein the angle $\alpha$ corresponds to half of the opening angle $\gamma$ of the bevel gear arranged on the guide vane-specific shaft. This embodiment ensures a meshing plane of the gearwheels that runs parallel to the turbine shaft.

Examples of the supercharged internal combustion engine are provided in which each guide vane-specific shaft forms, with the turbine shaft, an acute angle $\alpha$ for which the following applies: $15° \leq \alpha \leq 75°$.

Examples of the supercharged internal combustion engine are provided in which each guide vane-specific shaft forms, with the turbine shaft, an acute angle $\alpha$ for which the following applies: $25° \leq \alpha \leq 65°$.

Examples of the supercharged internal combustion engine are provided in which each guide vane-specific shaft forms, with the turbine shaft, an acute angle $\alpha$ for which the following applies: $35° \leq \alpha \leq 55°$.

Examples of the supercharged internal combustion engine are provided in which each guide vane-specific shaft forms, with the turbine shaft, an acute angle $\alpha$ for which the following applies: $40° \leq \alpha \leq 75°$.

In particular, examples of the supercharged internal combustion engine are provided in which each guide vane-specific shaft forms, with the turbine shaft, an acute angle $\alpha$ for which the following applies: $40° \leq \alpha \leq 65°$, preferably $45° \leq \alpha \leq 60°$.

The different angles or angle ranges make allowance for the fact that the speed vector of the approaching flow in the case of a mixed-flow turbine has a radial speed component and an axial speed component, and the ratio of said two speed components relative to one another may vary greatly, that is to say the inlet region, in which the guide vanes are arranged and which substantially defines the approaching flow, may be inclined to a greater or lesser extent relative to the turbine shaft. Consequently, the angle $\alpha$ between the turbine shaft and a guide vane-specific shaft may vary greatly.

Examples of the supercharged internal combustion engine are provided in which each guide vane-specific shaft is of rectilinear form. A rectilinear form of the shaft simplifies the kinematics of the adjustment device such that a rotation of the guide vane-specific shaft at the adjustment ring-side end causes a purely rotational movement of the associated guide vane, whereas an offset shaft causes a tumbling motion of the guide vane. As a result, a gapless arrangement of the rotatable guide vanes in the inlet region is possible, specifically in all rotational positions of the vanes. The latter is a significant advantage in relation to the prior art, as it is sought for the exhaust-gas flow to be conducted across the guide vanes, and not via a gap past the guide vanes.

Examples of the supercharged internal combustion engine are provided in which an actuating device is provided which comprises an actuator gearwheel which meshes with a gearwheel arranged on a guide vane-specific shaft, wherein, by rotation of the actuator gearwheel, it is possible for the gearwheel that meshes therewith, and via said gearwheel the adjustment ring and the other guide vane-specific gearwheels, to be rotated.

In this example, it is not the case that the adjustment ring is directly actuated, that is to say rotated, in order to adjust the guide vanes. Rather, in the present case, the adjustment ring serves merely for the kinematic coupling of the gearwheels arranged on the guide vane-specific shafts, wherein one of said gearwheels is set in rotation by means of an actuator gearwheel.

In this connection, examples of the supercharged internal combustion engine are provided in which the actuator gearwheel is arranged on that side of the gearwheel meshing therewith which faces away from the adjustment ring. The arrangement of the actuator gearwheel at the outside permits an actuation of the actuator gearwheel by way of externally imparted rotation, for example by a rod, that is to say permits good accessibility, whereas the adjustment ring is, according to the disclosure, an adjustment ring situated at the inside, which can duly be of relatively small dimensions owing to its arrangement at the inside, but which is also less easily accessible.

Examples of the supercharged internal combustion engine are provided in which the mixed-flow turbine has an outlet region which runs and is formed coaxially with respect to the turbine shaft, such that the flow of exhaust gas exiting the turbine runs substantially axially.

If the mixed-flow turbine is, for example, the high-pressure turbine of a multi-stage supercharging arrangement, the outlet region formed coaxially with respect to the turbine shaft permits, in interaction with a low-pressure turbine of axial type of construction arranged downstream, an axial supply of the exhaust gas to the low-pressure turbine with the least possible pressure losses, and thus the provision of exhaust gas which is as enthalpy-rich as possible at the low-pressure stage.

Examples of the supercharged internal combustion engine are provided in which an exhaust-gas recirculation arrangement is provided.

To adhere to future limits for nitrogen oxide emissions, use is increasingly being made of exhaust-gas recirculation, that is to say the recirculation of exhaust gases from the outlet side to the inlet side, whereby it is possible for the nitrogen oxide emissions to be considerably reduced with increasing exhaust-gas recirculation rate. Here, the exhaust-gas recirculation rate $x_{EGR}$ is determined as $x_{EGR}=m_{EGR}/(m_{EGR}+m_{fresh\ air})$, where $m_{EGR}$ denotes the mass of recirculated exhaust gas and $m_{fresh\ air}$ denotes the supplied fresh air or combustion air which, if appropriate, is conducted through a compressor and compressed. To achieve a significant reduction in nitrogen oxide emissions, high exhaust-gas recirculation rates are required. Exhaust-gas recirculation is also suitable for reducing the emissions of unburned hydrocarbons in the part-load range.

Examples are provided in which a shut-off element is provided in the line for exhaust-gas recirculation. Said shut-off element serves for the control of the exhaust-gas recirculation rate.

In this context, examples of the supercharged internal combustion engine are provided in which an exhaust-gas recirculation arrangement is provided which comprises a line which branches off from the exhaust-gas discharge system downstream of the mixed-flow turbine.

By contrast to a high-pressure EGR arrangement, which extracts exhaust gas from the exhaust-gas discharge system upstream of the turbine, it is the case in a low-pressure EGR arrangement that exhaust gas that has already flowed through the turbine is recirculated to the inlet side. For this purpose, the low-pressure EGR arrangement comprises a recirculation line which branches off from the exhaust-gas discharge system downstream of the turbine. The exhaust gas that is recirculated to the inlet side by means of the low-pressure EGR arrangement is thus also used, beforehand, for energy recovery in the mixed-flow turbine.

FIG. 1 schematically shows the mixed-flow turbine 1 of a first embodiment of the supercharged internal combustion engine. The speed vector of the approaching flow in the inlet region 6 of the turbine 1 has a radial component perpendicular to the shaft 4 of the turbine 1 and an axial component along the shaft 4. Shaft 4 has a rotational axis 102.

For the discharge of the hot exhaust gases from the cylinders, the internal combustion engine has an exhaust-gas discharge system 2. For the supercharging of the cylinders, at least one exhaust-gas turbocharger is provided which comprises a mixed-flow turbine 1 arranged in the exhaust-gas discharge system 2.

The mixed-flow turbine 1 comprises an impeller 5 which is arranged in a turbine housing 3 and which is mounted on a rotatable turbine shaft 4. The turbine housing 3, which is in the form of a spiral housing 3, has an inlet region 6 in which, upstream of the impeller 5, there is arranged an adjustable guide device 8, such that the mixed-flow turbine 1 is a variable turbine 1.

The guide device 8 has guide vanes 8a which are each arranged on a respective guide vane-specific shaft 8b and which can be rotated by an adjustment device 9. The guide vane-specific shafts 8b are of rectilinear form, such that a rotation at the adjustment ring-side end of the guide vane-specific shafts 8b affects a rotational movement of the associated guide vanes 8a. The adjustment device 9 has a rotatable adjustment ring 9a which is situated at the inside and which is mounted coaxially with respect to the turbine shaft 4 of the mixed-flow turbine 1 and which has an external toothing 9b. Each guide-vane specific shaft is angled with respect to the rotational axis of the turbine shaft 4, as shown by angle α.

On each guide vane-specific shaft 8b, there is arranged a respective gearwheel 8c which meshes with the external toothing 9b of the adjustment ring 9a, such that the guide vanes 8a can be adjusted by rotation of the adjustment ring 9a.

The gearwheels 8c arranged on the guide vane-specific shafts 8b are externally toothed bevel gears 8c. Each bevel gear has a bevel angle γ with respect to an axis corresponding to a non-angled bevel, e.g., a central axis of the bevel gear which herein is parallel to the angle of the guide vane specific shaft. Each guide vane-specific shaft 8b forms an acute angle α with the turbine shaft 4, wherein in one example half of the opening angle γ of the bevel gear 8c arranged on a guide vane-specific shaft 8b corresponds to said angle α.

An actuating device 10 is provided which comprises an actuator gearwheel 10a which meshes with one bevel gear 8c arranged on a guide vane-specific shaft 8b. By rotation of the actuator gearwheel 10a via a rod 10b, the bevel gear 8c that meshes with said actuator gearwheel, and via said bevel gear 8c the adjustment ring 9a and the other guide vane-specific bevel gears 8c, are rotated. The adjustment ring 9a serves for the kinematic coupling of the bevel gears 8c arranged on the guide vane-specific shafts 8a.

The turbine 1 has an outlet region 7 which runs coaxially with respect to the turbine shaft 4, such that the exhaust-gas flow exiting the turbine 1 in the outlet region 7 runs substantially axially.

Thus, a mixed-flow turbine that receives exhaust gas having both a radial and axial component may have its inlet geometry adjusted via an adjustable guide device comprising a plurality of guide vanes driven by bevel gears. The bevel angle of the bevel gears may be determined by the vane axis inclination (e.g., angle of the guide vanes with respect to the turbine shaft) in order to provide a tooth plane which is parallel to the turbine shaft. For example, if angle of the guide vanes is 45°, the bevel angle may be 22.5°. A pinion wheel (concentric to turbine shaft) connects all bevel wheels. Vane rotation (all vanes simultaneously) may be actuated by a drive pinion acting on one bevel wheel. The drive pinion may be hydraulically, pneumatically, and/or electrically driven via signals from a controller (such as the controller described in FIG. 2 below).

The adjustable guide device may have components that are sized and/or shaped to ensure a constant gear clearance to avoid sticking at varying component temperatures. For example, the bevel gear to vane shaft connection may be of a flat key design to compensate for variation of shaft length due to temperature.

Figure 2:
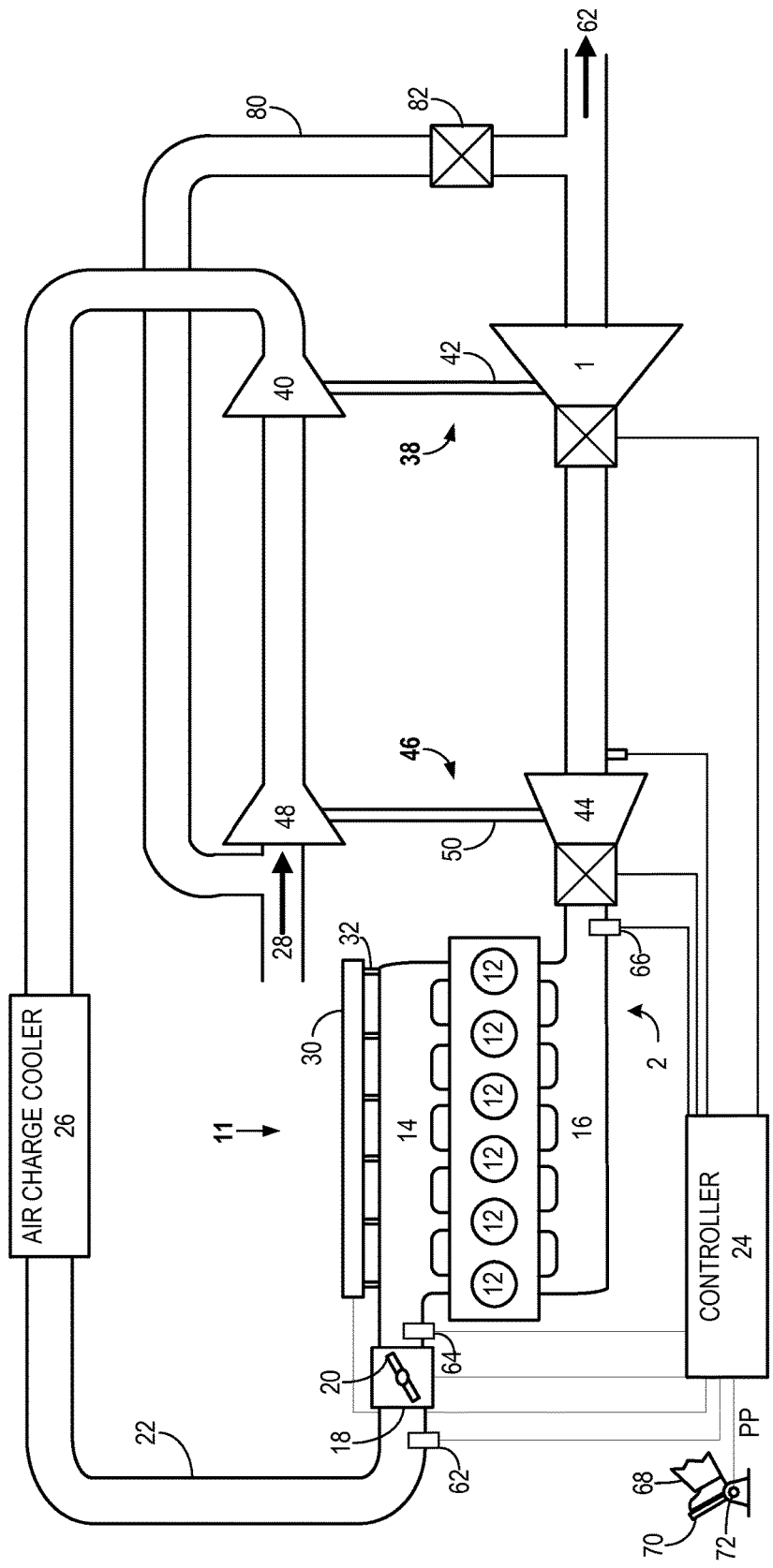
FIG. 2 schematically shows an example internal combustion engine.

Turning now to FIG. 2, a combustion engine 11 coupled to the exhaust-gas discharge system 2 of FIG. 1 is shown. Engine 11 may include a plurality of combustion chambers (i.e. cylinders) 12. Though the example engine shown in FIG. 2 includes six cylinders, engine 11 may include any number of cylinders, for example four or eight cylinders. The combustion chambers 12 may receive intake air from intake manifold 14 and may exhaust combustion gases via exhaust passage 16. A throttle 18 may be disposed upstream of intake manifold 14 along an intake passage 22. Throttle 18 may include a throttle plate 20. The position of throttle plate 20 may be varied by a controller 24 via a signal provided to an electric motor or actuator included with throttle 18, for example. In this manner, throttle 18 may be operated to vary the intake air provided to combustion chambers 12. An air charge cooler 26 may be disposed upstream of throttle 18 along intake passage 22 to cool fresh air entering the intake passage at 28. A fuel rail 30 with a plurality of fuel injectors 32 may provide fuel to combustion chambers 12. Fuel injectors 32 may be coupled directly to combustion chambers 12 for direct fuel injection or may alternatively or additionally be arranged in the intake manifold 14 for port injection of fuel into the intake port upstream of combustion chambers 12. Fuel may be delivered to fuel rail 30 by a fuel system (not shown) including a fuel tank and a fuel pump, for example. Controller 24 may control the fuel injection timing and pulse width.

The mixed-flow turbine 1 is illustrated as part of a first turbocharger 38 may be disposed along exhaust passage 16. Turbine 1 may be a variable geometry turbine (VGT), as described above with respect to FIG. 1, and may include a wastegate valve or variable nozzles, for example. The amount of expansion across the turbine of the first turbocharger 38 may be controlled by opening or closing the variable geometry turbine or the wastegate valve, for example. The variable geometry turbine or the wastegate valve may be controlled by controller 24. The compressor 40 of the first turbocharger 38 may be coupled to turbine 1 via a shaft 42 and may be located upstream of air charge cooler 26 along the intake passage 22. Increased expansion may be used to extract more heat from the exhaust and generate more power to drive the corresponding compressor, thus increasing boost. On the other hand, decreased expansion may be used to extract less heat from the exhaust and generate less boost.

The turbine 44 of a second turbocharger 46 may be disposed along the exhaust passage 16 upstream of the mixed-flow turbine 1. Turbine 44 may be a VGT or may include a wastegate valve, for example. The amount of expansion across the turbine of the second turbocharger 46 may also be controlled by opening or closing the variable geometry turbine or the wastegate valve, for example. The variable geometry turbine or the wastegate valve may be controlled by controller 24. Further, turbine 44 may be mixed-flow turbine, similar to the turbine of FIG. 1, or it may be radial turbine. The compressor 48 of the second turbocharger 46 may be coupled to turbine 44 via a shaft 50 and may be located in series and upstream of compressor 40 along the intake passage 22. Accordingly, the first turbocharger, which includes the mixed-flow turbine of FIG. 1, may be a low-pressure turbocharger relative to the second turbocharger, which may be considered a high-pressure turbocharger.

In one example, the first turbine 1 of the first turbocharger 38 may be smaller than the second turbine 44 of the second turbocharger 46, while in other examples the turbines may be of similar size or the second turbine of the second turbocharger may be smaller than the first turbine of the first turbocharger.

In another example, the position of the turbochargers may be switched such that the turbocharger including the mixed-flow turbine of FIG. 1 is a high-pressure turbocharger and the second turbocharger, which may or may not include a mixed-flow turbine, is the low-pressure turbine.

The exhaust system may further include an exhaust gas recirculation (EGR) passage 80 having an inlet coupled to the exhaust passage downstream of the mixed-flow turbine 1 and an outlet coupled to the intake passage upstream of the second compressor 48, in order to provide low-pressure EGR. Flow of EGR through the EGR passage may be controlled by an EGR valve 82. The EGR valve may be opened or closed (e.g., a degree of opening of the valve adjusted) via a signal sent from the controller. The EGR valve degree of opening may be adjusted by an actuator coupled to the valve element, which may be a hydraulic, pneumatic, or electric actuator.

Controller 24 may receive various signals from sensors coupled to engine 10 in addition to those discussed above, including measurement of inducted mass air flow (MAF) from mass air flow sensor 62; throttle position (TP) from a throttle position sensor; absolute manifold pressure signal, MAP, from sensor 64; and exhaust gas sensor 66. Sensor 66 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Manifold pressure signal MAP from a manifold pressure sensor may be used to provide an indication of vacuum, or pressure, in the intake manifold. During stoichiometric operation, the MAP sensor can give an indication of engine torque. Additionally, controller 24 may communicate with input from a vehicle operator 68 via an input device 70. In this example, input device 70 includes an accelerator pedal and a pedal position sensor 72 for generating a proportional pedal position signal PP.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example.

The controller 24 receives signals from the various sensors of FIG. 2 and employs the various actuators of FIG. 2 to adjust engine operation based on the received signals and instructions stored on a memory of the controller.

Figure 3:
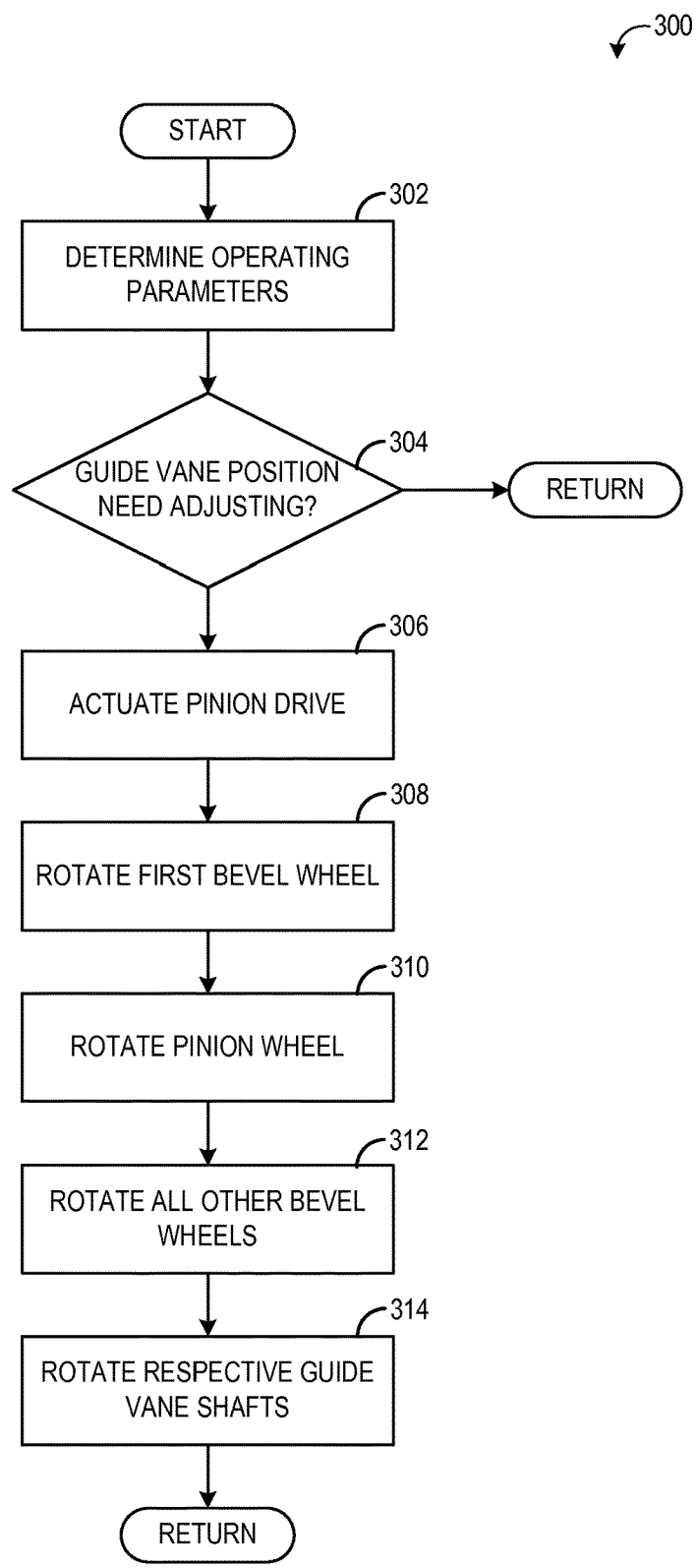
FIG. 3 is a flow chart illustrating a method for adjusting a mixed-flow turbine.

Turning now to FIG. 3, a method 300 for adjusting a guide device of a mixed flow turbine, such as the turbine 1 of FIGS. 1-2 is presented. Instructions for carrying out method 300 may be executed by a controller based on instructions stored on a memory of the controller and in conjunction with signals received from sensors of the engine system, such as the sensors described above with reference to FIG. 2. The controller may employ engine actuators of the engine system to adjust engine operation, according to the methods described below.

At 302, method 300 includes determining engine operating parameters. The determined parameters may include engine speed and load, boost pressure, exhaust temperature, and other parameters. At 304, method 300 determines if the position of the guide vanes of the turbine need to be adjusted. For example, the guide vane position may be adjusted as engine speed and/or load change. If the positions do not need to be adjusted, method 300 returns.

If the positions do need to be adjusted, method 300 proceeds to 306 to actuate a pinion drive of the adjustment device. The pinion drive may include a rotatable gear that rotates a first bevel wheel, and hence method 300 includes rotating a first bevel wheel at 308. At 310, a pinion wheel meshed with the first bevel wheel rotates. The rotation of the pinion wheel causes all remaining bevel wheels to rotate, as indicated at 312. Rotation of the bevel wheels rotates respective guide vane shafts, as indicated at 314, and thus causes each respective guide vane to rotate. Method 300 then returns.

The technical effect of actuating a pinion drive to rotate a guide vane shaft and hence adjust an associated guide vane is to control exhaust flow through a mixed flow turbine.

An example of a system, such as the system described above with respect to FIGS. 1-2 comprises a mixed-flow turbine arranged in an exhaust passage, the mixed-flow turbine having a turbine shaft coupled to a compressor; a plurality of guide vanes arranged in an inlet region of the mixed-flow turbine; a plurality of bevel wheels, each bevel wheel coupled to a respective guide vane via a respective guide vane shaft; a pinion wheel with a plurality of teeth to mesh with the plurality of bevel wheels; and a pinion drive coupled to one of the bevel wheels. In a first example, each guide vane shaft is positioned at an angle relative to the turbine shaft. In a second example, which optionally includes the first example, the system further comprises a controller having non-transitory instructions stored in memory that, when executed, cause the controller to activate the pinion drive to adjust a position of the bevel wheel to which the pinion drive is coupled.

An example method of operating an engine system, such as the system of FIGS. 1-2 includes actuating a pinion drive coupled to a bevel wheel to rotate the bevel wheel, rotation of the bevel wheel rotating a pinion wheel having a plurality of teeth, the plurality of teeth of the pinion wheel enmeshed with a one or more additional bevel wheels, where rotation of the pinion wheel rotates the one or more additional bevel wheels, rotation of each bevel wheel causing a change in position of a respective guide vane.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A supercharged internal combustion engine, comprising:
   an intake system for a supply of charge air;
   an exhaust-gas discharge system for discharge of exhaust gas; and
   at least one mixed-flow turbine which is arranged in the exhaust-gas discharge system, the mixed-flow turbine comprising:
   a turbine housing having an inlet region;
   at least one impeller arranged in the turbine housing and mounted on a turbine shaft;
   an adjustable guide device arranged in the inlet region upstream of the at least one impeller, the adjustable guide device comprising one or more guide vanes, each guide vane arranged on a guide vane-specific shaft;
   an adjustment device configured to rotate the one or more guide vanes, the adjustment device having a rotatable adjustment ring extending radially outward relative to the turbine shaft and which is mounted coaxially with respect to the turbine shaft of the mixed-flow turbine, the rotatable adjustment ring having an external toothing; and
   one or more gearwheels each coupled coaxially with a respective one of the guide vane-specific shafts, each gearwheel configured to mesh with the external toothing of the adjustment ring forming an acute angle $\alpha$ between the guide vane shafts and the turbine shaft and the acute angle $\alpha$ corresponds to half of an opening angle $\gamma$ of the one or more gearwheels, such that the one or more guide vanes are adjusted by rotation of the adjustment ring.

2. The supercharged internal combustion engine as claimed in claim 1, wherein each gearwheel is arranged on an outer circumference of the adjustment ring.

3. The supercharged internal combustion engine as claimed in claim 1, wherein the at least one mixed-flow turbine arranged in the exhaust-gas discharge system is a turbine of an exhaust-gas turbocharger which comprises the mixed-flow turbine arranged in the exhaust-gas discharge system and a compressor arranged in the intake system.

4. The supercharged internal combustion engine as claimed in claim 3, wherein the exhaust-gas turbocharger is a first exhaust-gas turbocharger having a first turbine and a first compressor, and further comprising at least one second exhaust-gas turbocharger which comprises a second turbine arranged in the exhaust-gas discharge system and a second compressor arranged in the intake system.

5. The supercharged internal combustion engine as claimed in claim 4, wherein the first exhaust-gas turbocharger serves as a low-pressure stage and the at least one second exhaust-gas turbocharger serves as a high-pressure stage, wherein the second turbine of the second exhaust-gas turbocharger is arranged upstream of the first turbine of the first exhaust-gas turbocharger, and the second compressor of the second exhaust-gas turbocharger is arranged downstream of the first compressor of the first exhaust-gas turbocharger.

6. The supercharged internal combustion engine as claimed in claim 1, wherein the external toothing of the rotatable adjustment ring is a straight toothing.

7. The supercharged internal combustion engine as claimed in claim 1, wherein each gearwheel is an externally toothed bevel gear.

8. The supercharged internal combustion engine as claimed in claim 1, wherein the following applies to the acute angle $\alpha$: $15° \leq \alpha \leq 75°$.

9. The supercharged internal combustion engine as claimed in claim 1, wherein the following applies to the acute angle $\alpha$: $25° \leq \alpha \leq 65°$.

10. The supercharged internal combustion engine as claimed in claim 1, wherein the following applies to the acute angle $\alpha$: $35° \leq \alpha \leq 55°$.

11. The supercharged internal combustion engine as claimed in claim 1, wherein the following applies to the acute angle $\alpha$: $40° \leq \alpha \leq 75°$.

12. The supercharged internal combustion engine as claimed in claim 1, wherein each guide vane-specific shaft is of rectilinear form.

13. The supercharged internal combustion engine as claimed in claim 1, wherein the mixed-flow turbine further comprises an actuating device comprising an actuator gearwheel which meshes with one of the one or more gearwheels, and wherein rotation of the adjustment ring is enabled by rotation of the actuator gearwheel.

14. The supercharged internal combustion engine as claimed in claim 13, wherein the actuator gearwheel is arranged on a side of the gearwheel meshing therewith which faces away from the adjustment ring.

15. The supercharged internal combustion engine as claimed in claim 1, wherein the mixed-flow turbine has an outlet region which runs and is formed coaxially with respect to the turbine shaft, such that a flow of exhaust gas exiting the turbine runs substantially axially.

16. A system, comprising:
a mixed-flow turbine having a turbine shaft coupled to a compressor;
a plurality of guide vanes arranged in an inlet of the mixed-flow turbine;
a plurality of bevel wheels each coupled to a respective guide vane via a respective guide vane shaft positioned coaxial with the bevel wheels;
a single pinion wheel positioned coaxially with the turbine shaft, interior to the plurality of bevel wheels and between at least part of the plurality of bevel wheels and an impeller;
the plurality of bevel wheels meshing at an angle with the single pinion wheel forming an acute angle $\alpha$ between the coaxial guide vane shafts and the coaxial turbine shaft; and
a pinion drive coupled to one of the bevel wheels.

17. The system of claim 16, wherein each guide vane shaft is positioned at an angle relative to the turbine shaft and extends radially outward from their respective bevel wheels.

18. The system of claim 16, further comprising a controller having non-transitory instructions stored in memory that, when executed, cause the controller to activate the pinion drive to adjust a position of the bevel wheel to which the pinion drive is coupled.

19. The system of claim 16, wherein the acute angle $\alpha$ corresponds to half of an opening angle $\gamma$ of one or more of the plurality of bevel wheels.

20. A method, comprising:
actuating a pinion drive coupled to a bevel wheel to rotate the bevel wheel, rotation of the bevel wheel rotating a single pinion wheel positioned coaxial with a turbine shaft, interior to a plurality of bevel wheels and between at least part of the plurality bevel wheels and an impeller,
rotation of the single pinion wheel rotating the plurality of bevel wheels meshed with the pinion wheel at a mesh angle forming an acute angle $\alpha$ between a plurality of guide vane shafts mounted and the turbine shaft,
rotation of each bevel wheel causing a change in position of a respective guide vane at an inlet of a mixed-flow turbine.

* * * * *